United States Patent [19]

de Wit et al.

[11] Patent Number: 5,525,265
[45] Date of Patent: Jun. 11, 1996

[54] LIQUID CRYSTALLINE AND INFRARED-SENSITIVE LIQUID-CRYSTALLINE POLYESTERS

[75] Inventors: Paulus P. de Wit, Westervoort; Erwin W. P. Erdhuisen, Duiven, both of Netherlands; John Griffiths, Leeds, United Kingdom

[73] Assignee: Akzo Nobel N.V., Arnhem, Netherlands

[21] Appl. No.: 764,267

[22] Filed: Sep. 23, 1991

[30] Foreign Application Priority Data

Sep. 24, 1990 [NL] Netherlands ............... 9002081

[51] Int. Cl.$^6$ .................... F21V 9/04; C09K 19/52
[52] U.S. Cl. ............... 252/587; 252/299.01; 252/299.67; 252/299.66; 528/272; 528/308; 528/308.7
[58] Field of Search .................. 252/582, 587, 252/299.01, 299.67, 299.66; 528/308, 308.7, 272

[56] References Cited

U.S. PATENT DOCUMENTS

| 4,481,314 | 11/1984 | Rule | 252/582 |
|---|---|---|---|
| 4,896,292 | 1/1990 | Eich et al. | 252/587 |
| 5,207,952 | 5/1993 | Griffin, III | 252/582 |

FOREIGN PATENT DOCUMENTS

| 0171045 | 2/1985 | European Pat. Off. . |
|---|---|---|
| 0200833 | 11/1985 | European Pat. Off. . |
| 0216619 | 9/1986 | European Pat. Off. . |
| 0232964 | 1/1987 | European Pat. Off. . |
| 0260786 | 6/1987 | European Pat. Off. . |
| 0302497 | 8/1988 | European Pat. Off. . |
| 0314473 | 10/1988 | European Pat. Off. . |
| 0329396 | 2/1989 | European Pat. Off. . |
| 0354753 | 8/1989 | European Pat. Off. . |
| 0360457 | 9/1989 | European Pat. Off. . |
| 0369432 | 11/1989 | European Pat. Off. . |
| 3211400 | 3/1982 | Germany . |
| 3334056 | 9/1983 | Germany . |
| 3534646 | 9/1985 | Germany . |
| 3603267 | 2/1986 | Germany . |
| 3623395 | 7/1986 | Germany . |
| 59-014150 | 7/1982 | Japan . |
| 59-060443 | 9/1982 | Japan . |
| 179294 | 2/1984 | Japan . |
| 61-031490 | 7/1984 | Japan . |
| 2146787 | 9/1984 | United Kingdom . |
| 2200650 | 6/1987 | United Kingdom . |
| 2211374 | 10/1988 | United Kingdom . |
| 2216281 | 2/1989 | United Kingdom . |
| 2216282 | 2/1989 | United Kingdom . |
| 8605505 | 9/1986 | WIPO . |
| 8903578 | 4/1989 | WIPO . |

OTHER PUBLICATIONS

Cyclic Polyhydroxy Ketones. I. Oxidation Products of Hexahydroxy benzene (Benzenehexol), A. J. Fatiadi et al., Journal of Research, vol. 67A, No. 2, Mar.–Apr. 1963.
Fast Switching Films of Nematic Side Chain Copolymers, Liquid Cryst., 1989, vol. 5, No. 5, 1497–1516, R. Kiefer et al.
Laser Addressed Thermo–optic Effect in a Novel Dyed Liquid–Crystalline Polysiloxane, C. B. McArdle et al., Liquid Crystals 1987, vol. 2, No. 5, 573–584.
Near–infrared Absorbing Methine Dyes Based on Dicyanovinyl Derivatives of Indane–1, 3–dione, K. A. Bello et al., J. Chem. Soc., Perkin Trans. II 1987.
Synthesis and Characterization of Liquid–crystalline Copolymers with Dichroic Dyes and Mesogens as Side Gorups, H. Ringsdorf et al., Makromol. Chem. 188, 1355–1366 (1987).
Synthesis and Phase Behaviour of Liquid–crystalline Side Group Polyesters, B. Reck et al., Liquid Crystals, 1990, vol. 8, No. 2, 247–262.

*Primary Examiner*—Philip Tucker
*Attorney, Agent, or Firm*—Ralph J. Mancini; Louis A. Morris

[57] ABSTRACT

Disclosed are liquid-crystalline and infrared-sensitive liquid-crystalline polyesters for optical data storage, processes for the preparation of the same, and an apparatus comprising an infrared-sensitive liquid-crystalline polyester. Owing to covalently bonded dye the liquid crystalline polyester is infrared sensitive and high concentrations of dye are obtainable, without having detrimental effects on the properties of the liquid-crystalline polyester. This results in a highly sensitive liquid-crystalline polyester for optical data storage. Infrared dyes which are preferably bonded in liquid-crystalline polyester are croconium, squarilium, azo, and azamethine dyes.

3 Claims, No Drawings

LIQUID CRYSTALLINE AND INFRARED-SENSITIVE LIQUID-CRYSTALLINE POLYESTERS

BACKGROUND OF THE INVENTION

The invention is in the field of liquid-crystalline polyesters suitable for use in optical data processing, more particularly liquid-crystalline polyesters which are infrared-sensitive due to the presence of an infrared-absorbing dye.

Liquid-crystalline polymeric compositions containing infrared-absorbing dye are known from the literature. Such polymeric compositions, including polyesters, are described in European Patent Application 0 302 497. Information can be written in such polymeric compositions with the use of a solid-state laser ($\lambda$=750 to 870 nanometers). The infrared-absorbing dye serves to convert the laser light energy into thermal energy. According to the above-mentioned publication, information is written in films of liquid-crystalline polymers in the following manner. The film has been aligned in advance with, for instance, an electric field, and so consists of one domain and is hence transparent. Using a laser, the film is heated locally to above a phase transition temperature and then rapidly cooled. As a result of the rapid cooling the heated section of the liquid-crystalline layer is not restored to its original transparent state but remains light-scattering, i.e., opaque. In this way opaque lines can be written in a transparent film.

Writing transparent lines in an opaque film is also known from other publications. In those cases an unaligned film is employed, which is heated locally with a laser. During the irradiation with the laser an electric or magnetic field is applied, the heated section of the film thus being aligned and hence rendered transparent. (Cf., e.g., GB-A-2 146 787).

For writing data it is desirable to have the highest possible concentration of dye in the polymeric composition without, of course, said composition's properties being adversely affected. The drawback to the above-mentioned polymeric composition is that the infrared-absorbing dye is mixed in with the polymer, to form so-called solid solutions. As a rule only low concentrations of dye can be dissolved in these polymers, since otherwise there will be crystallization or segregation of the dyes, especially on the long term. Moreover, in the case of solid solution polymers it is often hard to make optically transparent films with homogeneous dye distribution.

Liquid-crystal polymers are also known in which the dye is incorporated into the polymer chain. For instance, in U.S. Pat. No. 4,896,292 dye is incorporated into the polymer chain to adapt the absorption behavior of liquid-crystalline polymers to the wavelength of the laser to be used. However, the dyes in question are not infrared-absorbing dyes. These known dyes ($\lambda$=633 nm) generally are much more stable than infrared-absorbing dyes, but they are insensitive in the wave-length field of solid-state lasers ($\lambda$=750–870 nm).

If it is desired to utilize solid-state lasers, infrared-absorbing dyes have to be added to the polymer. The advantage of solid-state lasers over other lasers is that they are small in size and relatively inexpensive.

Further, so-called polymeric dyes, which absorb in the infrared wavelength field, are known. However, these polymers are not liquid- crystalline. For use in optical data storage a thin layer of such a polymeric dye is applied to a film of liquid-crystalline polymer. This is, however, not an optimum solution to the problem either. The adhesion between the layers and the sensitivity of the resulting film generate a score of difficulties.

To attain the object of the invention, an infrared-sensitive liquid-crystalline polymeric composition suitable for optical data storage in which the dyes are homogeneously distributed and do not segregate or crystallize out, and which has sufficient sensitivity, two problems need to be solved.

First, liquid-crystalline polymeric compositions suitable for optical data storage must be found into which infra-red absorbing dyes can be incorporated without the liquid-crystalline behavior of the polymeric composition being adversely affected.

Secondly, infrared-absorbing dyes must be found which are stable enough for incorporation into liquid-crystalline polymers and also possess good thermal and photochemical stability. Moreover, the dye must be functionalizable, i.e., it must be possible to render the dye co-polymerizable, e.g. esterifiable.

SUMMARY OF THE INVENTION

In one embodiment, the current invention is a liquid-crystalline polyester suitable for use in optical data storage, the liquid-crystalline polyester comprised of a polyester backbone and a mesogenic group of the general formula:

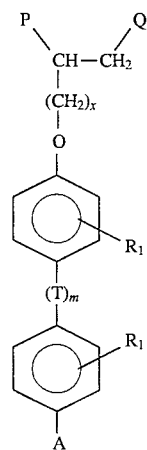

wherein $R_1$ is —halogen, —$R_2$, —$OR_2$, —$CR_2$, —$COR_2$, —CN or —$CF_3$;

$R_2$ is —H or an alkyl group having 1–3 carbon atoms;

$R_3$ is an alkyl group having 1–24 carbon atoms;

T is

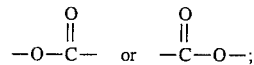

m is 0 or 1;

A is —CN, —$NO_2$, —CH=C(CN)$_2$, —H, —$OR_3$, —$CF_3$, or

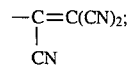

x is an integer in the range of 0 through 6; and

P and Q represent the polyester backbone.

In another embodiment, the invention is an infrared-sensitive liquid-crystalline polyester suitable for use in optical data storage, the liquid crystalline polyester having an infrared-absorbing dye having two esterifiable groups, said dye covalently incorporated into the polyester.

In particular said liquid crystalline polyester may be comprised of a polyester backbone and a mesogenic group of the general formula:

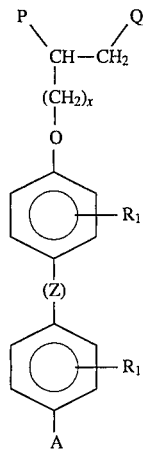

wherein $R_1$ is —halogen, —$R_2$, —$OR_2$,

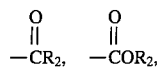

—CN or —$CF_3$;

$R_2$ is —H or an alkyl group having 1–3 carbon atoms;
$R_3$ is an alkyl group having 1–24 carbon atoms;
Z is —$(CR_2=CR_2)_n$—$(CR_2=Y)_m$—,

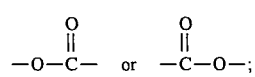

Y is =$CR_2$—, =C—CN or =N;
A is —CN, —$NO_2$, —CH=$C(CN)_2$, —H, —$OR_3$, —$CF_3$, or

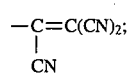

n is an integer in the range of 0 through 4;
x is an integer in the range of 0 through 6;
m is 0 or 1; and
P and Q represent a polyester backbone.

The invention also relates to a solid-state laser and a liquid-crystalline polyester.

DETAILED DESCRIPTION OF THE INVENTION

POLYMERS

The dye-containing liquid-crystalline polymeric composition has to meet various requirements if it is to be used in optical data storage. Needless to say, it will have to contain a mesogenic (liquid crystal- forming) group. Further, the glass transition temperature $T_g$ should be above room temperature.

Polymers found to be suitable contain a mesogenic group and satisfy the following formula (Formula I):

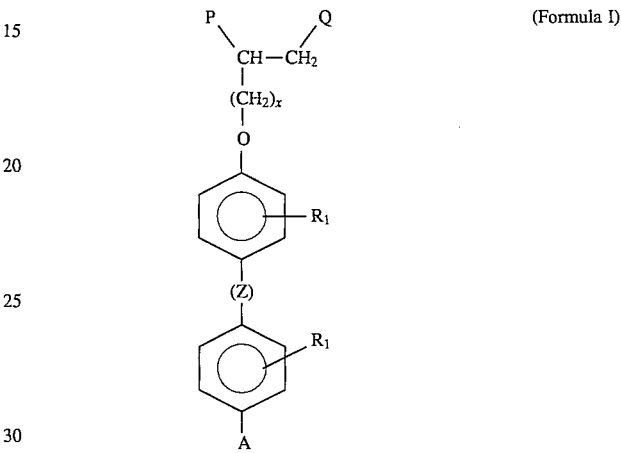

(Formula I)

wherein $R_1$ is —halogen, —$R_2$, —$OR_2$,

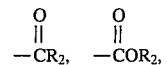

—CN or —$CF_3$;

$R_2$ is —H or an alkyl group having 1–3 carbon atoms;
$R_3$ is an alkyl group having 1–24 carbon atoms;
Z is —$(CR_2=CR_2)_n$—$(CR_2=Y)_m$—,

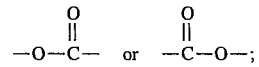

Y is =$CR_2$—, =C—CN or =N;
A is —CN, —$NO_2$, —CH=$C(CN)_2$, —H, —$OR_3$, —$CF_3$, or

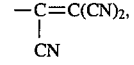

n is an integer in the range of 0 through 4;
x is an integer in the range of 0 through 6;

m is 0 or 1; and

P and Q represent a polyester backbone.

Especially suitable in this group are the polyesters not yet described hereinbefore which satisfy the formula below (Formula II):

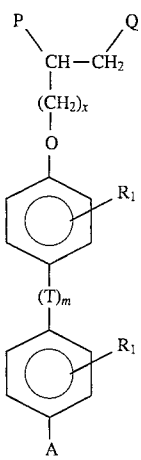

wherein

T:

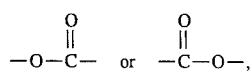

and the other symbols have the same meaning as in Formula I.

The polyesters according to Formula I have the additional advantage that their $T_g$ and be regulated by the selection of the acid chlorides of which they are composed, viz. the radicals P and Q. Examples of suitable acid chlorides are terephthaloyl chloride and adipoyl chloride. Incorporating rigid acid chlorides into the main chain makes it possible to increase the Tg to above 60° C. This renders it unnecessary to clamp the polymer films between solid substrates (say, glass) in order to prevent the data written in the polymer from being damaged. Such polyesters are so-called freestanding polyesters.

This high $T_g$ makes it possible to write out data in the following new way.

The preparative process is such as to give a film composed of small smectic domains, i.e., a light-scattering film. It is heated locally with a laser to above its clearing temperature $T_c$ (this is the temperature at which the polymer's liquid-crystalline properties disappear owing to the mesogenic groups' random distribution at such temperatures), and then rapidly cooled to room temperature. The heated section of the film remains in the isotropic, i.e. transparent phase. Since the $T_g$ is much in excess of room temperature, there is no longer any conversion from this thermodynamically unfavorable isotropic state into thermodynamically more favorable small domains.

In the case of the already known liquid-crystal polymers with, as a rule, a low $T_g$, it was always necessary to employ an electric or magnetic field or another way of alignment. To write opaque lines in a transparent background required alignment of the film beforehand, while writing transparent lines in an opaque film called for the application of an electric or magnetic field to the film during the writing. The liquid-crystalline polyesters which have now been developed permit recording without the use of an electric or magnetic field or an other way of alignment.

DYES

The dyes which are to be incorporated have to be chemically stable under the polymerization conditions and should be fully incorporated into the polyester; i.e., the polymer preferably contains substantially no free dye and most preferably does not contain any free dye. Of course, to be incorporable into the polyester the dyes must have two esterifiable groups. Between the esterifiable group and the dye spacers can be provided in a known manner.

The dyes can be incorporated into the polyester's main chain, but they can also be incorporated as a side chain. Dyes that are incorporated into the polyester's main chain include croconium and squarilium dyes.

Depending on the benzene ring substituents at the squarilium ring, squarilium dyes are suitable for use in the red or the infrared field. The formula of a preferred infrared-absorbing squarilium dye is given below in the form of a unit incorporated into the polyester molecule:

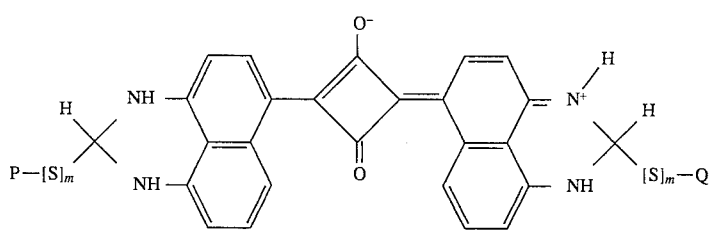

Formula III wherein

P and Q represent the groups of the polyester molecule into which the dye is incorporated, S stands for a spacer group and m=0 or 1.

The formula of a preferred croconium dye is given below in the form of a unit incorporated into the polyester molecule:

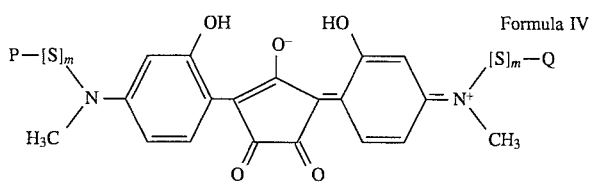

Formula IV wherein the symbols have the same meaning as in Formula III.

Dyes which can be incorporated into the polyester as a side chain include azamethine and azo dyes.

Infrared-absorbing azamethine dyes which are preeminently suitable for use in the invention satisfy the following formula, in which they are shown in the esterifiable form:

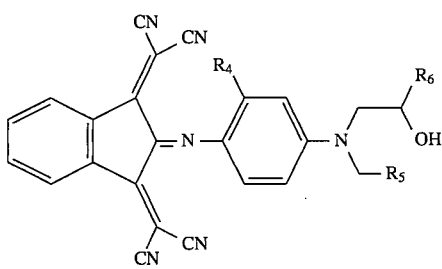

Formula V wherein $R_4$ is —H or —NHCOCH$_3$, $R_5$ is —CH$_2$OH if $R_4$ is —H and —CH$_3$ if $R_4$ is —NHCOCH$_3$, $R_6$ is —H if $R_4$ is —H and —CH$_2$OH if $R_4$ is —NHCOCH$_3$.

The formula of a suitable infrared-absorbing azo dye in the esterifiable form is shown below:

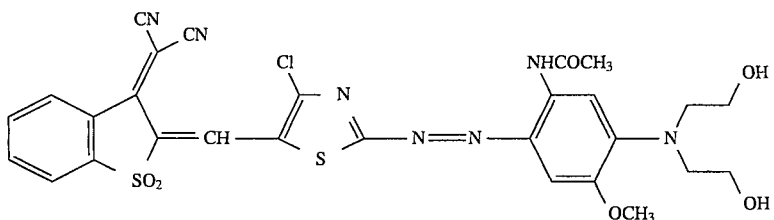

PREPARATION

Polyesters with or without infrared-absorbing dyes according to the invention can be prepared as follows: a compound containing a mesogenic group and two esterifiable groups, diacid chlorides and, optionally, the infrared-absorbent dye in the esterifiable form, are dissolved in an apolar or polar aprotic solvent (depending on the dye used), and stirred at room temperature for some time and subsequently at elevated temperature for several hours. The resulting polymer is precipitated by pouring the reaction mixture in alcohol/water.

The glass transition temperature of the infrared-sensitive liquid crystalline polyester can be varied by preparing a low-molecular weight polyester incorporating much dye and blending it with a quantity of liquid-crystalline polyester without dye.

Alternatively, of course, it is possible to incorporate mixtures of dyes into the polyester.

Manufacturing a film from the polymer may be as follows: the polymer is dissolved in a solvent and then cast onto a flexible polymeric carrier, causing a 5-micrometer thick liquid-crystalline film suitable for data storage to be formed. The solvent is removed and a scattering film is obtained by keeping the formed film for some time at a temperature between the glass transition temperature $T_g$ and the clearing temperature $T_c$. The film can be provided with a protective layer to enhance its mechanical strength and its lifetime. If the protective layer is UV-absorbent as well, the photochemical stability will be enhanced also.

The invention will be illustrated with reference to a number of examples.

The abbreviations used in the examples have the following meanings:

PEES-diol: a compound according to Formula II, wherein $R_1$ is —H, A is —OC$_5$H$_{11}$, m is 1, x is 1, P and Q are OH-groups, and T is

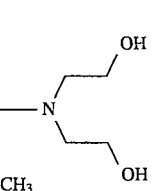

PEES-polyester: a compound like PEES-diol, except that P and Q stand for groups of the polymer molecule into which the group is incorporated.

HEBI-diol: a compound according to Formula II, wherein $R_1$ is —H, A is —OC$_6$H$_{13}$, m is 0, x is 1, and P and Q are OH-groups.

HEBI-polyester: a compound like HEBI-diol, except that P and Q stand for groups of the polymer molecule into which the group, is incorporated.

HOCS-diol: a compound according to Formula I, wherein $R_1$ is —H, A is —CN, Z is —CH=CH—, x is 1, and P and Q are OH-groups.

Formula VI

HOCS-polyester: a compound like HOCS-diol, except that P and Q stand for groups of the polymer molecule into which the group is incorporated.

SQ: a compound according to Formula III, wherein $[S]_m$ is $(CH_2)_3$, and P and Q are OH-groups.

CR: a compound according to Formula IV, wherein $[S]_m$ is —CH$_2$—CH$_2$—, and P and Q are OH-groups.

AZ: a compound according to Formula VI.

AM1: a compound according to Formula V, wherein $R_4$ is —H, $R_5$ is —CH$_2$OH, and $R_6$ is H.

AM2: a compound according to Formula V, wherein $R_4$ is —NHCOCH$_3$, $R_5$ is —CH$_3$, and $R_6$ is —CH$_2$OH.

$T_g$: glass transition temperature, with the on-set and off-set temperatures being given.

$T_c$: clearing temperature.

% dye: the percentages of dye are given in percent by weight, calculated on the overall percentage of polyester.

$\lambda_{max}$: the wavelength at which the polyester reaches its absorption maximum (given in nanometers (nm)).

Mw: weight average molecular weight (measured by gel permeation chromatography vis-a-vis polystyrene).

$\epsilon$: extinction coefficient.

EXAMPLE 1 a. Synthesis of PEES-diol

Synthesis of 4-pentyloxyphenyl-4'-hydroxybenzoate:

To a solution of 165 g (0.92 moles) of 4-pentyloxyphenol and 84 g (0.61 moles) of 4-hydroxybenzoic acid in 2 l of toluene were added 3 g of concentrated sulphuric acid and 1.3 g of boric acid. The water was removed by azeotropic distillation over a period of 48 hours. About 1 l of toluene was removed by distillation and the product crystallized at room temperature. The product was filtered, washed with hexane, and dried. The yield was 145 g (79% of theory).

Synthesis of 4-pentyloxyphenyl-4'-oxybenzoylepoxypropyl ether:

To a solution of 85 g (0.28 moles) of 4-pentyloxyphenyl-4'-hydroxybenzoate and 0.6 g of benzyltrimethylammonium chloride in 170 ml of epichlorohydrin was added, in 1 hour at 70° C., a solution of 10.5 g (0.26 moles) of sodium hydroxide in 60 ml of water. The reaction mixture was stirred at 70° C. for 2 hours. After cooling to room temperature 250 ml of dichloromethane were added. The layers were separated, the organic layer was washed with 100 ml of water, dried with anhydrous magnesium sulphate, and subsequently evaporated, the residue being crystallized from methanol and isopropanol. The yield was 73 g (73% of theory).

Synthesis of 4-pentyloxyphenyl-4'-oxybenzoyl-2,3-dihydroxypropyl ether:

35.6 g (100 m moles) of 4-pentyloxyphenyl-4'-oxybenzoylepoxypropyl ether were dissolved in 500 ml of tetrahydrofuran (THF) and 75 ml of a 20% aqueous perchloric acid solution added to the whole. The reaction mixture was stirred at room temperature for 24 hours, poured in ice, and extracted with dichloromethane. The organic layer was washed with aqueous potassium bicarbonate and water, dried with anhydrous magnesium sulphate, and subsequently evaporated, the residue being crystallized twice from toluene. The yield was 19.3 g (52% of theory).

b. Synthesis of AM1

Synthesis of 4-nitroso-N,N-diethanol-aniline:

To 85 ml of concentrated hydrochloric acid were slowly added 45.3 g (250 mmoles) of N,N-diethanol-aniline. The yellow reaction mixture was cooled to 5° C. and a solution of 18.0 g (260 mmoles) of sodium nitrite in 40 ml of water added thereto in 30 minutes. On completion of the adding of the nitrite solution the mixture was allowed to stand for 1 hour. The crystalline orange 4-nitroso-N,N-diethanol-aniline hydrochloride was filtrated and washed with 50 ml of ether and ethyl acetate. The hydrochloride was stirred in 50 ml of water and 60 ml of a 10% aqueous sodium hydroxide solution were slowly added. The green precipitate was filtrated, washed three times with 25 ml of water, and dried. The yield was 40 g (75% of theory).

Synthesis of 1,3-bisdicyanovinylindane:

For a description of the process reference is made to K. A. Bello, L. Cheng, and J. Griffiths, *J. Chem. Soc.* Perkin Trans II, 815 (1987).

Synthesis of AM1:

A solution of 42.2 g (100 mmoles) of 1,3-bisdicyanovinylindane and 25.2 g (120 mmoles) of 4-nitroso-N,N-diethanol-aniline in 400 ml of ethanol was heated over a period of 20 minutes to 60° C., stirred for 15 minutes at this temperature, and in the course of 1 hour cooled to room temperature. 250 ml of water were added and the dark blue product was precipitated. The product was filtrated, washed with water, and dried. The yield was 36 g (78% of theory).

$\lambda_{max}$: 745 nm (in THF) and $\epsilon$: 25 200 l.mole$^{-1}$.cm$^{-1}$ (in THF).

c. Synthesis of PEES-polyester containing 4% of AM1 (polymer 1)

To a mixture of 2.69 g (7.2 mmoles) PEES-diol, 151 mg (0.347 mmoles) AM1, 0.69 g (3.8 mmoles) adipoyl chloride and 0.77 g (3.8 mmoles) terephthaloyl chloride in 15 ml dry THF was added in 5 minutes, under nitrogen, and at a temperature of 15° C., 1.7 ml (23 mmoles) pyridine. The mixture was stirred for 1 hour at room temperature, for 1 hour at 50° C. and for 2 hours at reflux temperature. The reaction mixture was cooled to room temperature, filtrated and the polymer was precipitated in 150 ml ethanol. The polymer was filtrated, washed twice with 50 ml ethanol and dried. The yield was 3.00 g (80% of theory).

$T_g$: 42°/52° C., $T_c$: 67° C., and Mw: 7400.

3.5% of dye was covalently incorporated, and no free dye remained.

$\lambda_{max}$: 713 nm (in THF).

EXAMPLE 2 a. Synthesis of HEBI-diol

Synthesis of 4-hexyloxy-4'-hydroxybiphenyl:

A mixture of 74 g (0.40 moles) of biphenol and 20 g (0.50 moles) of sodium hydroxide in 600 ml of ethanol was refluxed for 1 hour. At reflux temperature 66 g (0.40 moles) of 6-bromohexane were added over a period of 1 hour. The reaction mixture was refluxed for 18 hours and cooled to room temperature, and the precipitate was filtrated. The filtrate was treated with 500 ml of water and the precipitated 4-hexyloxy-4'-hydroxybiphenyl was filtrated and washed with water. After drying 29 g of product were obtained. An additional amount of product was obtained by refluxing the precipitate collected from the reaction mixture with 45 g of potassium hydroxide in 600 ml of ethanol for 3 hours. This mixture was cooled to room temperature and the insoluble dihexyloxybiphenyl filtered off. The clear filtrate was treated with 200 ml of 6N hydrochloric acid and the precipitated 4-hexyloxy-4'-hydroxybiphenyl was filtrated, washed with water, and dried. The yield was 19 g. The total yield was 48 g (44% of theory).

Synthesis of 4-(2,3-dihydroxypropyloxy)-4'-hexyloxybiphenyl:

A mixture of 2.70 g (10 mmoles) of 4-hexyloxy-4'-hydroxybiphenyl, 0.50 g (12 mmoles) of sodium hydroxide, 0.70 g of potassium carbonate, and 2.50 g (12 mmoles) of solketal mesylate in 25 ml of DMA was heated to 130° C. over a period of 30 minutes and then stirred at this temperature for 1 hour. After cooling the reaction mixture was poured into 200 ml of water. The precipitated product was filtrated and washed with water. The crude product was refluxed for 1 hour in a mixture of 35 ml of tetrahydrofuran (THF) and 5 ml of 3N hydrochloric acid. After cooling 25 ml of water were added, and the product was filtrated, washed with water, and dried. The product was crystallized from 150 ml of ethyl acetate. The yield was 2.4 g (70% of theory).

b. Synthesis of HEBI-polyester containing 3% of AM1 (polymer 2)

To a mixture of 1.16 g (4.8 mmoles) HEBI-diol, 70.4 mg (0.162 mmoles) AM1, 0.47 g (2.5 mmoles) adipoyl chloride and 0.52 g (2.5 mmoles) terephthaloyl chloride in 10 ml dry THF was added in 5 minutes, under nitrogen, and at a temperature of 15° C., 1.3 ml (15 mmoles) pyridine. The mixture was stirred for 2 hours at room temperature, for 2 hours at 50° C. and for 2 hours at reflux temperature. After cooling to room temperature, the polymer solution was filtrated and the polymer was precipitated in 200 ml methanol. The polymer was filtrated, washed twice with 50 ml methanol and dried. The yield was 1.96 g (84% of theory).

$T_g$: 48°/54° C., $T_c$: 87° C., and Mw: 7800.

2.9% of dye was covalently incorporated, and no free dye remained.

$\lambda_{max}$: 719 nm (in THF).

EXAMPLE 3 a. Synthesis of HOCS-polyester without dye (polymer 3)

For the preparation of HOCS-diol reference is made to EP-A-0 350 113.

To a mixture of 44.3 g (150 mmoles) of HOCS-diol, 13.7 g (75 mmoles) of adipoyl chloride, and 15.2 g (75 mmoles) of terephthaloyl chloride in 200 ml of dry tetrahydrofuran (THF) there were added in 5 minutes, under nitrogen and at a temperature of 15°–20° C., 37 ml (0.45 moles) of pyridine. The mixture was stirred at room temperature for 1 hour, at 50° C. for another hour, and at reflux temperature for 2 hours. After cooling to room temperature the reaction mixture was filtered and the resulting polymer precipitated in 1.5 l of methanol. The polymer was filtrated, washed twice with 300 ml of methanol being used each time, and then dried. The yield was 55 g (89% of theory).

$T_g$: 86°/95° C., $T_c$: 121° C., and Mw: 14 200.

EXAMPLE 4 a. Synthesis of CR

For the synthesis of N-methyl-N-hydroxyethyl-3-aminophenol reference is made to GB Patent Specification No. 1 190 274.

For the synthesis of croconic acid, cf. A. J. Fatiadi, H. S. Isbell, and W. F. Sager, *J. Res. Nat. Bur. Stand.*, Sect. 67A, p. 153 (1963).

Synthesis of CR:

A mixture of 0.19 g (1.0 mmoles) of croconic acid and 0.32 g (2.0 mmoles) of N-methyl-N-hydroxyethyl-3-aminophenol in 50 ml of n-butanol was kept under nitrogen and at reflux temperature for 3 hours. The reaction product was cooled to room temperature. The precipitated brown product was filtrated, washed 3 times with 50 ml of methanol being used each time,, and dried. The yield was 0.34 g (77% of theory).

$\lambda_{max}$: 830 nm (in dimethylsulphoxide (DMSO)) and $\epsilon$: 145 000 l.mole$^{-1}$.cm$^{-1}$ (DMSO).

b. Synthesis of HOCS-polyester containing 10% of CR (polymer 4)

To a mixture of 5.32 g (18.0 mmoles) of HOCS-diol and 0.86 g (2.0 mmoles) of CR in 25 ml of dimethylacetamide (DMA) there were added, under nitrogen and at room temperature, 1.83 g (10.0 mmoles) of adipoyl chloride and 2.03 g (10.0 mmoles) of terephthaloyl chloride. The mixture was kept at 45° C. for 5 hours and then cooled to room temperature. The resulting polymer was precipitated in a mixture of 200 ml of methanol and 50 ml of water, filtrated, and dried. It was next dissolved in 40 ml of chloroform, filtrated, and precipitated in 300 ml of n-hexane. The precipitated polymer was filtrated again and dried. The yield was 7.0 g (81% of theory).

$T_g$: 73°/83° C., $T_c$: 95° C., and Mw: 4000.

4.0% of dye was covalently incorporated and no free dye remained.

$\lambda_{max}$: 815 nm (in chloroform), 850 nm (measured on the coated polymer film).

EXAMPLES 5–8

Blends of polymer 3 and polymer 4 (polymers 5–8)

A portion of polymer 4 and a portion of polymer 3 were dissolved in 10 ml of chloroform, filtrated, and precipitated in 50 ml of n-hexane. The precipitated polymer blend was filtrated and dried. Polymers 5–8 are specified in TABLE I below.

TABLE I

| Polymer | g polymer 4 | g polymer 3 | % CR | $T_g$(° C.) | $T_c$ (° C.) |
|---|---|---|---|---|---|
| 5 | 0.75 | 0.25 | 3 | 76/85 | 97 |
| 6 | 0.50 | 0.50 | 2 | 79/88 | 110 |
| 7 | 0.25 | 0.75 | 1 | 89/90 | 116 |
| 8 | 0.125 | 0.875 | 0.5 | 82/92 | 119 |

EXAMPLE 9 a. Synthesis of SQ

A mixture of 15.8 g (100 mmoles) 1,8-diaminonaphthalene, 11.2 g (110 mmoles) 3-acetyl-1-propanol and 1.0 g Amberlyst® 15 ion-exchange resin in 100 ml ethanol was heated at reflux temperature for 2 hours. The dark solution was filtered and 100 ml water was added. The precipitated crude product was filtered, dried and crystallized from 1 l toluene. The yield was 17 g (70% of theory). A mixture of 0.68 g (6.0 mmoles) squaric acid and 2.91 g (12 mmoles) of the synthesized naphthalene derivative in 90 ml n-butanol and 30 ml benzene was heated under reflux with a dean-stark trap to remove water. After 90 minutes the mixture was cooled and concentrated in vacuo to 20 ml. 100 ml ether was added and the deposited solid filtered off, giving 2.2 g crude product. The dye was purified by flash column chromatography (10% methanol in dichloromethane). The yield was 0.70 g (21% of theory).

$\lambda_{max}$: 827 nm (in dimethylsulphoxide (DMSO)) and $\epsilon$: 128 000 l.mol$^{-1}$.cm$^{-1}$ (DMSO).
$\lambda_{max}$: 812 nm (in THF) and $\epsilon$: 103 000 l.mol$^{-1}$.cm$^{-1}$ (in THF).

b. Synthesis of HOCS-polyester containing 4% of SQ (polymer 9)

To a mixture of 845 mg (2.86 mmoles) of HOCS-diol, 50 mg (0.089 mmoles) of SQ, 270 mg (1.48 mmoles) of adipoyl chloride, and 300 mg (1.48 mmoles) of terephthaloyl chloride in 25 ml of THF were added in 5 minutes, under nitrogen and at 15° C., 680 mg (8.60 mmoles) of pyridine. The mixture was stirred at room temperature for 1 hour, for 1 hour at 50° C., and for 3 hours at reflux temperature. The reaction mixture was cooled to room temperature and the resulting polymer precipitated in 100 ml of methanol and 20 ml of water. Next, it was filtrated, washed twice with 50 ml of ethanol being used each time, and dried. The yield was 1.10 g (88% of theory).

$T_g$: 74°/80° C., $T_c$: 124° C., and Mw: 4400.

3.7% of dye was covalently incorporated and no free dye remained.

$\lambda_{max}$: 811 nm (in THF).

EXAMPLE 10 a. Synthesis of AZ

Diazotisation of 2-amino-4-chloro-5-formylthiazole:

2.8 g (41 mmoles) powdered sodium nitrite was slowly added to 30 ml 98% sulphuric acid keeping the temperature below 3° C., with stirring. The mixture was warmed to 70° C. and kept at that temperature for 1 hour and then cooled to 0° C. To this was added 6.5 g (40 mmoles) powdered 2-amino-4-chloro-5-formylthiazole slowly with stirring and cooling, keeping the temperature at 0° C. After 1 hour a thick yellow solution of the diazonium salt was obtained.

Coupling of 5-acetylamino-2-methoxy-N,N-di(2-hydroxyethyl)-aniline with the diazonium salt of 2-amino-4-chloro-5-formylthiazole:

10.9 g (41 mmoles) 5-acetylamino-2-methoxyN,N-di(2-hydroxyethyl)-aniline was dissolved in a mixture of 400 ml water and 7.7 ml 98% sulphuric acid, and the solution cooled to 0° C. The diazo solution was added dropwise to the solution with stirring, keeping the temperature below 5° C. with external cooling. When all the diazo solution had been added, stirring was continued for 4 hours at 0° C. The product was filtered off, washed until acid free with water and dried in an oven at ca. 70° C. The yield of the crude product was 10.6 g (60% of theory).

Synthesis of AZ:

5.43 g (12.3 mmoles) of the coupling product and 2.83 g (12.3 mmoles) 3-dicyanomethylene-2,3-dihydro-benzo[b]thiophene-1,1-dioxide were added to 320 ml ethanol and then heated under relux for 4 hours. The hot suspension was rapidly filtered and the resultant solid washed with hot ethanol until the washings were colorless. The solid was dried in an oven at ca. 70° C. The yield was 6.36 g (79% of theory).

$\lambda_{max}$: 787 nm (in tetrahydrophuran (THF)) and $\epsilon$: 48 400 l.mol$^{-1}$.cm$^{-1}$ (in THF).

b. Synthesis of HOCS-polyester containing 3% of AZ (polymer 10)

To a mixture of 916 mg (3.10 mmoles) of HOCS-diol, 50 mg (0.077 mmoles) of AZ, 311 mg (1.70 mmoles) of adipoyl chloride, and 298 mg (1.47 mmoles) of terephthaloyl chloride in 6 ml of dry THF were added in 5 minutes, under nitrogen and at room temperature, 680 mg (8.60 mmoles) of pyridine. The mixture was stirred at room temperature for 30 minutes and then at 50° C. for 3 hours. The reaction mixture was cooled to room temperature and the resulting polymer precipitated in 50 ml of methanol and 10 ml of water. Next, it was filtrated, washed twice with 50 ml of ethanol being used each time, and dried. The yield was 1.20 g (90% of theory).

$T_g$: 70°/79° C., $T_c$: 138° C., and Mw: 3910.

2.9% of dye was covalently incorporated and no free dye remained.

$\lambda_{max}$: 745 nm (in THF), 800 nm (in the coated polymer film).

EXAMPLE 11 a. Synthesis of HOCS-polyester containing 3% of AM1 (polymer 11)

To a mixture of 17.2 g (58.3 mmoles) of HOCS-diol, 0.75 g (1.7 mmoles) of AM1, 8.32 g (45.5 mmoles) of adipoyl chloride, and 3.11 g (15.3 mmoles) of terephthaloyl chloride in 75 ml of dry tetrahydofuran (THF) there were added in 5 minutes, under nitrogen and at a temperature of 15°–20° C., 15 ml (0.19 moles) of pyridine. The mixture was stirred at room temperature for 2 hours, at 50° C. for 2 hours, and at reflux temperature for 2 hours. After cooling to room temperature the polymer solution was filtrated and the resulting polymer precipitated in 1 l of ethanol. The polymer was filtrated, washed twice with 200 ml of ethanol being used each time, and then dried. The yield was 23 g (91% of theory).

$T_g$: 72°/79° C., $T_c$: 108° C., and Mw: 17 300.

2.4% of dye was covalently incorporated and no free dye remained.

$\lambda_{max}$: 712 nm (in THF), 746 nm (in the coated polymer film).

EXAMPLE 12 a. Synthesis of AM2

6.29 g (22.4 mmoles) 3-acetylamino-4-nitroso-N-ethyl-N-(2,3-propanediol)-aniline was dissolved in 20 ml dichloromethane, and to this was added 5.00 g (20.6 mmoles) 1,3-bisdicyanovinylindane and 80 ml acetic anhydride. The solution was stirred for 1 hour, with cooling in an ice-water bath. The suspension was filtered and the solid washed with a little acetic anhydride, followed by diethyl ether. The crude product was dried in air at room temperature for 12 hours. The crude product was purified by column chromatography (silica, dichloromethane: acetic acid: tetrahydofuran (THF)= 1:1:1). The yield was 4.5 g (43% of theory).

$\lambda_{max}$: 795 nm (in THF) and $\epsilon$: 29 200 l.mol$^{-1}$.cm$^{-1}$ (in THF).

b. Synthesis of HOCS-polyester containing 3% of AM2 (polymer 12)

To a mixture of 3.36 g (11.4 mmoles) of HCOS-diol, 151 mg (0.298 mmoles) of AM2, 1.07 g (5.48 mmoles) of adipoyl chloride, and 1.19 g (5.84mmoles) of terephthaloyl chloride in 25 ml of dry THF there were added in 5 minutes, under nitrogen and at a temperature of 15° C., 2.70 g (34.1 mmoles) of pyridine. The mixture was stirred at room temperature for 1 hour, at 50° C. for another hour, and at reflux temperature for 3 hours. The reaction product was cooled to room temperature and filtrated, the resulting polymer precipitated in 250 ml of ethanol. The polymer was filtrated, washed twice with 100 ml of ethanol being used each time, and dried. The yield was 4.35 g (87% of theory).

$T_g$: 78°/86° C., $T_c$: 124° C., and Mw: 5010.

2.9% of dye was covalently incorporated and no free dye remained.

$\lambda_{max}$: 785 nm (in THF), 790 nm (in the coated polymer film).

EXAMPLE 13 a. Synthesis of HOCS-polyester containing 6% of AM2 (polymer 13)

To a mixture of 3.30 g (11.2 mmoles) of HOCS-diol, 303 mg (0.599 mmoles) of AM2, 1.10 g (6.0 mmoles) of adipoyl chloride, and 1.22 g (6.0 mmoles) of terephthaloyl chloride in 15 ml of dry THF there were added in 5 minutes, under nitrogen and at a temperature of 15°–20° C., 3.0 ml (37 mmoles) of pyridine. The mixture was stirred at room temperature for 1 hour, at 50° C. for 2 hours, and at reflux temperature for 2 hours. The reaction mixture was cooled to room temperature and filtrated, the resulting polymer precipitated in 300 ml of ethanol. The polymer was filtrated, washed twice with 50 ml of ethanol being used each time, and dried. The yield was 4.75 g (94%).

$T_g$: 86°/95° C., Tc: 112° C., and MW: 7800.

4.8% of dye was covalently incorporated and no free dye remained.

$\lambda_{max}$: 785 nm (in THF), 790 nm (in the coated film).

We claim:

1. A liquid-crystalline polyester suitable for use in optical data storage comprising a polyester backbone and mesogenic groups of the general formula:

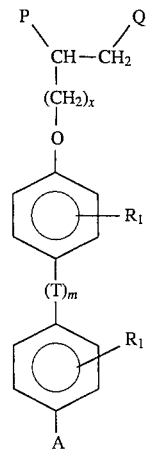

wherein $R_1$ is —halogen, —$R_2$, —$OR_2$,

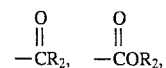

—CN or —$CF_3$;

$R_2$ is —H or an alkyl group having 1–3 carbon atoms;

$R_3$ is an alkyl group having 1–24 carbon atoms;

T is

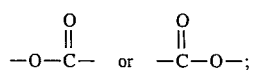

m is 0 or 1;

A is —CN, —NO$_2$, —CH=C(CN)$_2$, —H, —OR$_3$, —CF$_3$, or

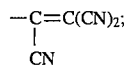

x is an integer in the range of 0 through 6; and

P and Q represent the polyester backbone.

2. An near infrared-sensitive liquid-crystalline polyester suitable for use in optical data storage comprising a polyester backbone and mesogenic groups of the general formula:

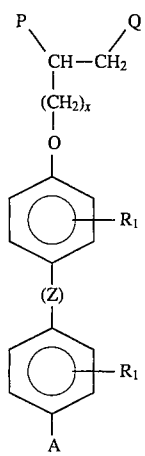

wherein

Z is —(CR$_2$=CR$_2$)$_n$—(CR$_2$=Y)$_m$—,

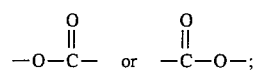

Y is =CR$_2$—, =C—CN or =N;

R$_1$ is —halogen, —R$_2$, —OR$_2$, —CR$_2$, —COR$_2$, —CN or —CF$_3$;

R$_2$ is —H or an alkyl group having 1–3 carbon atoms;

R$_3$ is an alkyl group having 1–24 carbon atoms;

A is —CN, —NO$_2$, —CH=C(CN)$_2$, —H, —OR$_3$, —CF$_3$, or

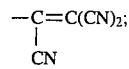

x is an integer in the range of 0 through 6;

n is an integer in the range of 0 through 4; and

P and Q represent the polyester backbone, the liquid-crystalline polyester further comprising an infrared-absorbing dye having two esterifiable groups, said dye being covalently incorporated into the polyester.

3. A liquid-crystalline polyester of claim 2 wherein the infrared-absorbing dye is selected from the group consisting of croconium compounds, squarilium compounds, azamethine dyes and azo dyes.

* * * * *